US008328166B2

(12) United States Patent
O'Brien et al.

(10) Patent No.: US 8,328,166 B2
(45) Date of Patent: Dec. 11, 2012

(54) RESTRAINT SYSTEM

(75) Inventors: Matthew M. O'Brien, Tustin, CA (US); Christopher C. Culbertson, Irvine, CA (US); Colin A. Godby, Costa Mesa, CA (US); Stephen M. King, Irvine, CA (US); Grant R. McCloud, Huntington Beach, CA (US); Charles E. Van Druff, Laguna Hills, CA (US)

(73) Assignee: MillenWorks, Tustin, CA (US)

( * ) Notice: Subject to any disclaimer, the term of this patent is extended or adjusted under 35 U.S.C. 154(b) by 787 days.

(21) Appl. No.: 12/372,658

(22) Filed: Feb. 17, 2009

(65) Prior Publication Data

US 2009/0212159 A1 Aug. 27, 2009

Related U.S. Application Data

(60) Provisional application No. 61/028,753, filed on Feb. 14, 2008.

(51) Int. Cl.
*B66D 1/48* (2006.01)

(52) U.S. Cl. ........ 254/276; 254/267; 254/269; 254/323; 242/382.4; 242/383.2; 242/384.2; 242/384.6

(58) Field of Classification Search .................. 254/223, 254/257, 267, 269, 276, 179, 323; 242/382.2, 242/382.4, 383, 383.2, 383.5, 384, 384.2, 242/384.6
See application file for complete search history.

(56) References Cited

U.S. PATENT DOCUMENTS

| | | | | | |
|---|---|---|---|---|---|
| 5,779,319 | A | * | 7/1998 | Merrick | 297/484 |
| 5,785,269 | A | * | 7/1998 | Miller et al. | 242/379.1 |
| 5,934,596 | A | * | 8/1999 | Gorman et al. | 242/379.1 |
| 6,155,513 | A | * | 12/2000 | Smithson | 242/383.2 |
| 6,655,718 | B2 | * | 12/2003 | Eusebi | 280/801.1 |
| 7,137,649 | B2 | * | 11/2006 | Eusebi | 280/806 |
| 7,140,571 | B2 | * | 11/2006 | Hishon et al. | 242/390.8 |
| 7,413,247 | B2 | * | 8/2008 | Van Druff et al. | 297/216.17 |
| 7,481,399 | B2 | * | 1/2009 | Nohren et al. | 244/122 R |

* cited by examiner

*Primary Examiner* — Emmanuel M Marcelo
(74) *Attorney, Agent, or Firm* — Inskeep IP Group, Inc.

(57) ABSTRACT

In a preferred embodiment, a restraint system is described for restraining a standing occupant in a vehicle such as a plane or helicopter. The restraint system includes a webbing strap that winds and unwinds from a spool assembly. The spool assembly includes a trigger assembly that locks a spool from rotation, a manual release assembly for manually releasing the trigger assembly and lock, and an adjustable payout assembly that determines the maximum length that the webbing strap can be pulled out before stopping (i.e., the number of rotations of the spool). The trigger assembly can trigger the lock assembly from one or more sensors. Further, the trigger assembly can be arranged to automatically unlock after a triggering event, manually unlocked after a triggering event or a combination of the two for different sensors.

10 Claims, 13 Drawing Sheets

RESTRAINT SYSTEM

RELATED APPLICATIONS

This application claims priority to U.S. Provisional Application Ser. No. 61/028,753 filed Feb. 14, 2008 entitled Crew Restrain System, which is hereby incorporated herein by reference.

BACKGROUND OF THE INVENTION

Vehicles, such as aircraft, often include restraint systems to prevent occupants from unwanted movement and injury. Typically, these restraint systems restrain the occupant from movement by releasably strapping the occupant to a chair or similar vehicle furniture.

However, some vehicles, such as helicopters or air cargo delivery planes may require an occupant to move about the interior of the vehicle. Intentional or unintentional vehicle motion such as turbulence or banking into a turn can cause an occupant to lose their balance or be thrown about the vehicle's interior. In some open vehicles such as rescue helicopters and military cargo planes, the occupant is in further danger of being thrown from the vehicle.

Therefore, what is needed is an occupant restraint system that allows an occupant to move about the interior of a vehicle, yet restrains them from unwanted movement and other dangers.

SUMMARY OF THE INVENTION

In a preferred embodiment, a restraint system is described for restraining a standing occupant in a vehicle such as a plane or helicopter. The restraint system includes a webbing strap that winds and unwinds from a spool assembly. The spool assembly includes a trigger assembly that locks a spool from rotation, a manual release assembly for manually releasing the trigger assembly and lock, and an adjustable payout assembly that determines the maximum length that the webbing strap can be pulled out before stopping (i.e., the number of rotations of the spool). The trigger assembly can trigger the lock assembly from one or more sensors. Further, the trigger assembly can be arranged to automatically unlock after a triggering event, manually unlocked after a triggering event or a combination of the two for different sensors.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
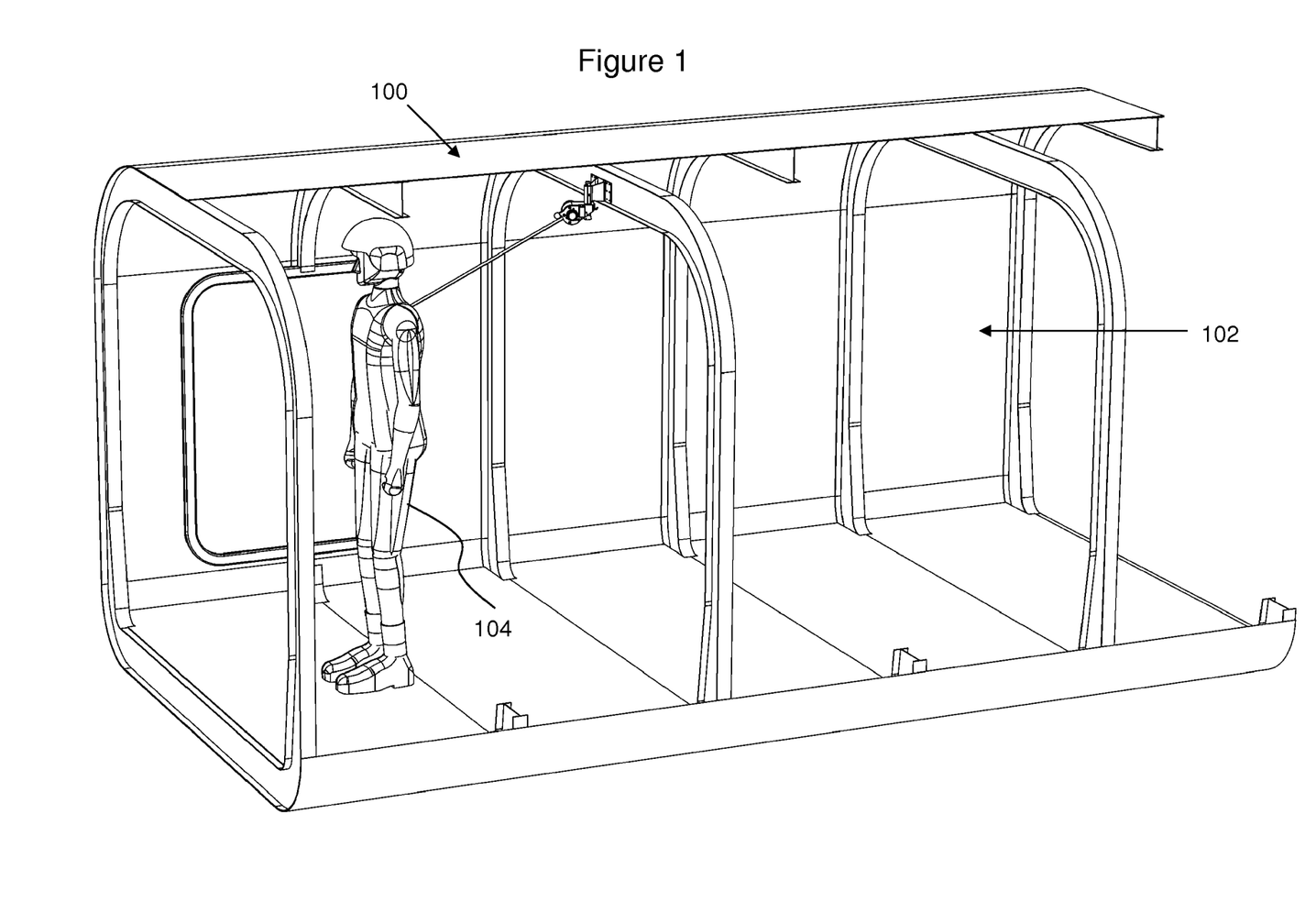
FIG. 1 illustrates a perspective view of a restraint system attached to an occupant within a vehicle according to a preferred embodiment.
Figure 2:
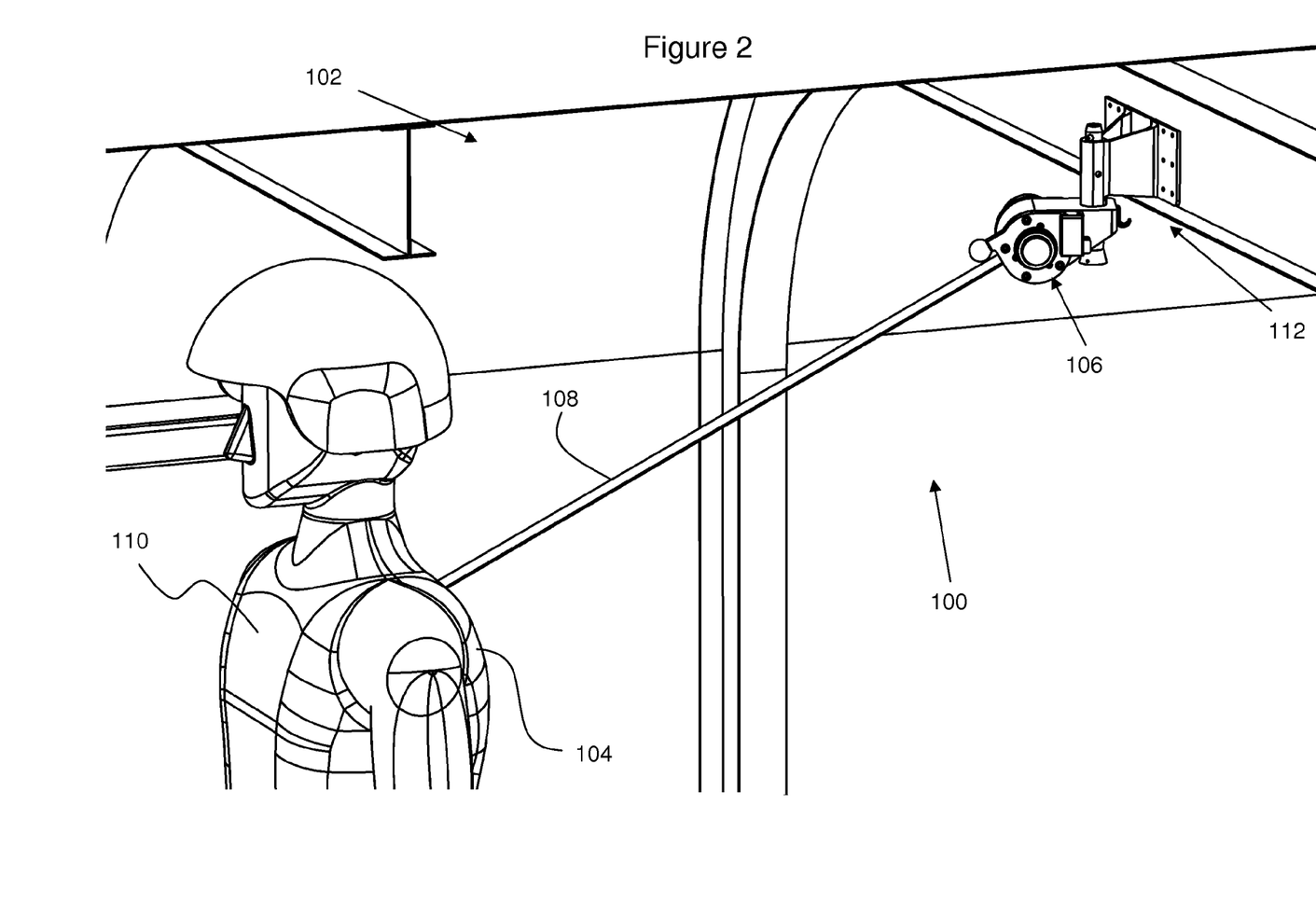
FIG. 2 illustrates a magnified perspective view of the restraint system and occupant of FIG. 1.

FIGS. 1 and 2 illustrate a preferred embodiment of an occupant restraint system 100 for a vehicle, such as a plane or helicopter. Generally, the occupant restraint system 100 includes a spool assembly 106 and a webbing strap 108 that is selectively wound and unwound from the spool assembly 106.

Preferably the spool assembly is pivotally mounted to the side or ceiling of a vehicle's interior 102 by pivot bracket 112. This arrangement allows the spool assembly 106 to pivot in any direction as the occupant 110 moves through the vehicle's interior 102.

The webbing strap 108 is preferably latched to a harness 110 worn by an occupant. As the occupant 110 moves within the vehicle's interior 102, the spool assembly 106 releases and retracts the webbing strap 108 as needed. However, during sudden or forceful movement, the spool assembly 106 locks, preventing further extension of the webbing strap 108 and thereby preventing excessive movement of the occupant 110.

In addition to or in place of the pivot bracket, the spool assembly can be connected to a trolley device that runs along a track as seen in U.S. Pat. No. 7,275,710, the contents of which are hereby incorporated by reference. Hence, the user can walk along an extended length of a vehicle (e.g., the length of an airplane) while attached to the restrain system.

Figure 3:
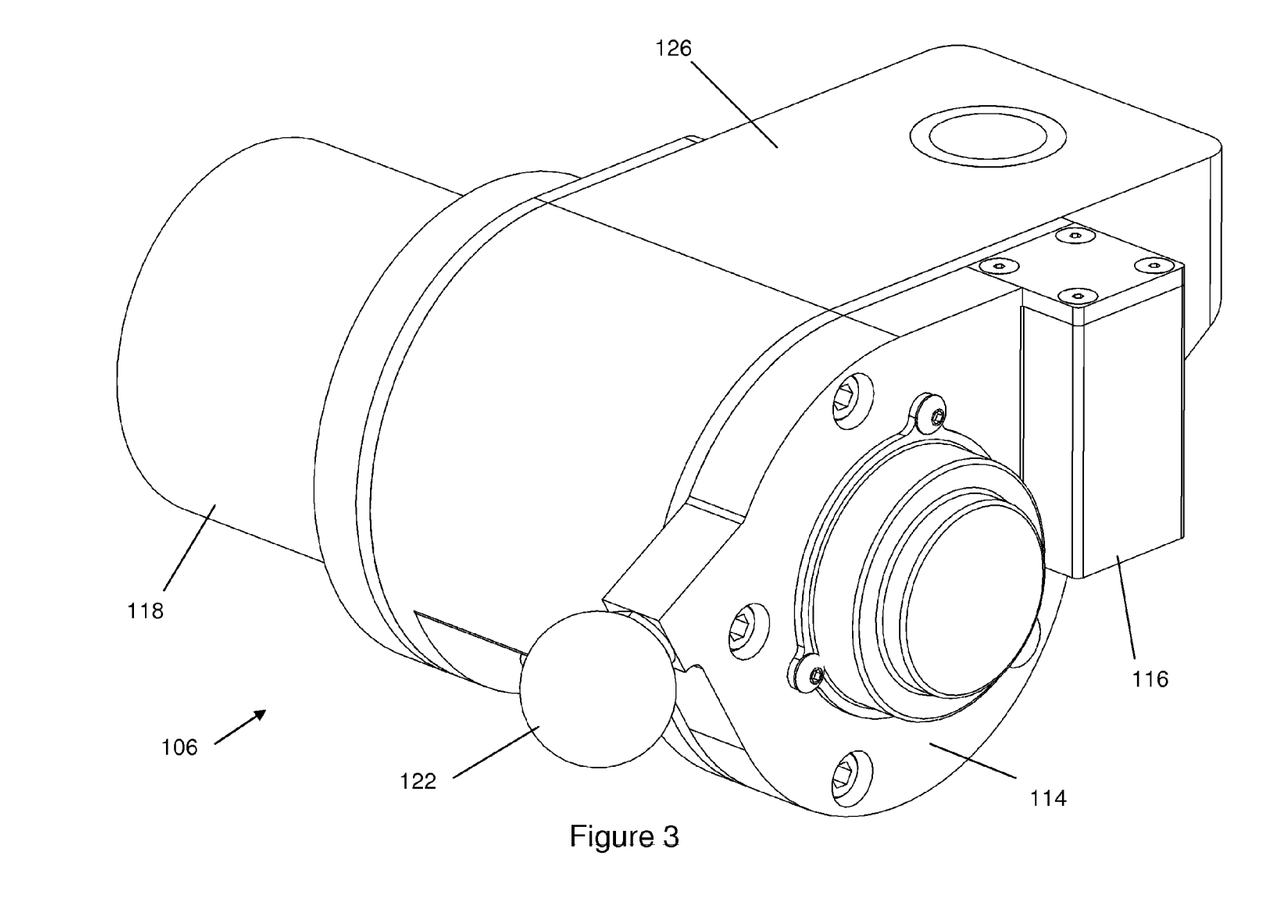
FIG. 3 illustrates a perspective view of a spool assembly of FIG. 1.
Figure 4:
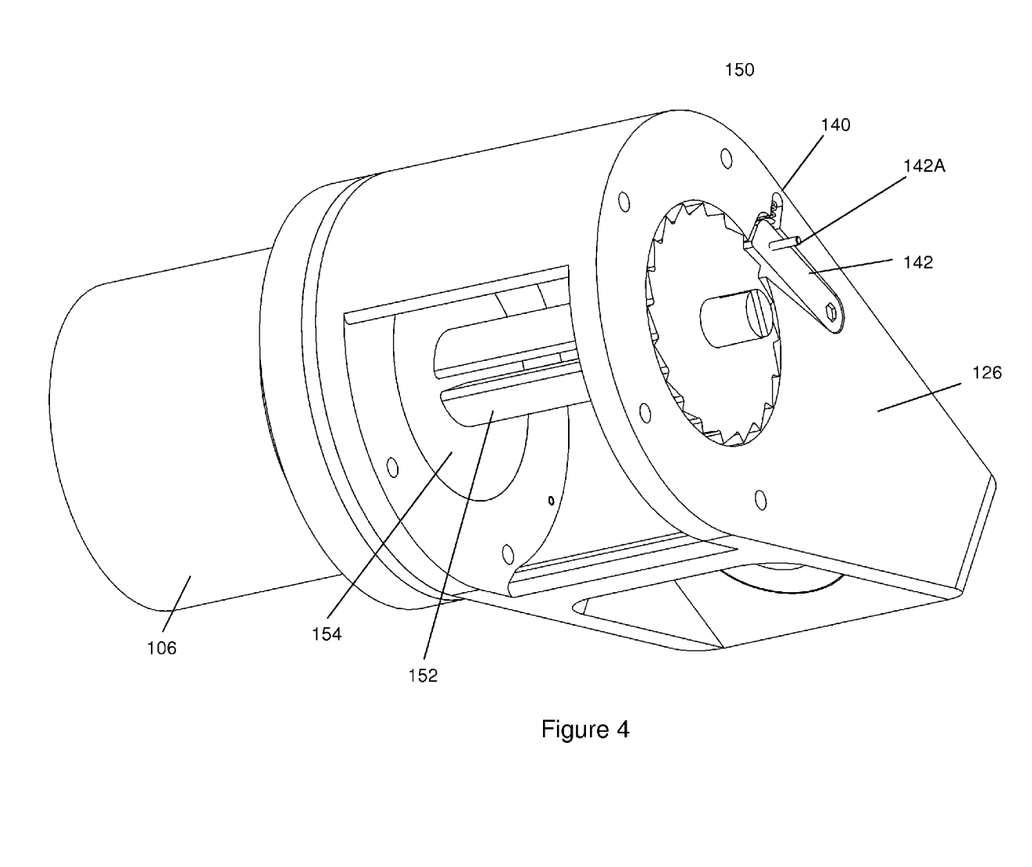
FIG. 4 illustrates a perspective view of the ratchet and pawl assembly according to a preferred embodiment.
Figure 5:
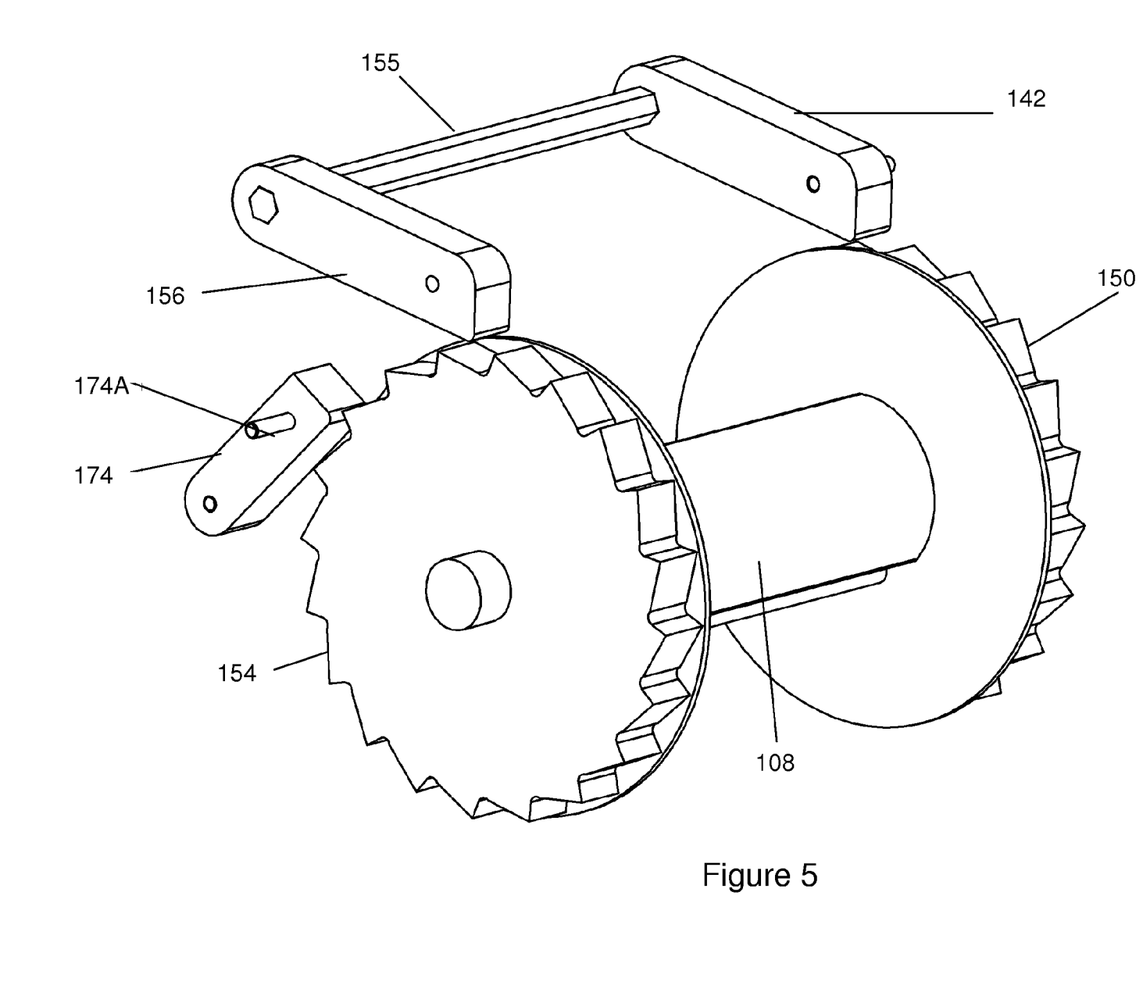
FIG. 5 illustrates a perspective view of only the ratchet and pawl assembly of FIG. 4.

FIG. 3 illustrates a magnified view of the spool assembly 106, including a framework 126, outer coverings 114 and 116, a webbing strap payout adjustment mechanism 118 and a manual lock reset handle. When the spool assembly 106 is caused to lock further spooling of the webbing strap 108 (e.g., due to rapid webbing payout velocity), the user can release the spool assembly 106 by pulling on the spring-biased manual reset handle 122.

FIGS. 4-8 illustrate various views of the trigger mechanism of the spool assembly 106. Turning first to the ratchet and pawl engagement assembly (seen best in FIGS. 4 and 5), this assembly prevents the spool 150 from rotating during a triggering event (e.g., a crash or sudden acceleration) by way of a first pawl member 142 that selectively engages a first spool ratchet 150 and a second pawl member 156 that selectively engages a second spool ratchet 154. The first pawl member 142 is biased towards the first spool ratchet 150 by pawl spring 140. The second pawl member 156 is linked to the first pawl member 142 via a connecting shaft 155, allowing the second pawl member 156 to move in unison with the first pawl member 142.

During normal operation, a trigger mechanism 121 (seen best in FIGS. 6 and 7) maintains a pawl pin 142A and therefore the first pawl member 142 and second pawl member 156 in a raised position, away from the jagged surfaces of ratchets 150 and 154. When the trigger mechanism 121 "triggers", it releases any resistance on the pawl pin 142A and thereby allows the pawls 142 and 156 to be biased against the ratchets 150 and 154. This released pawl position stops the movement of the spool 152.

Figure 6:
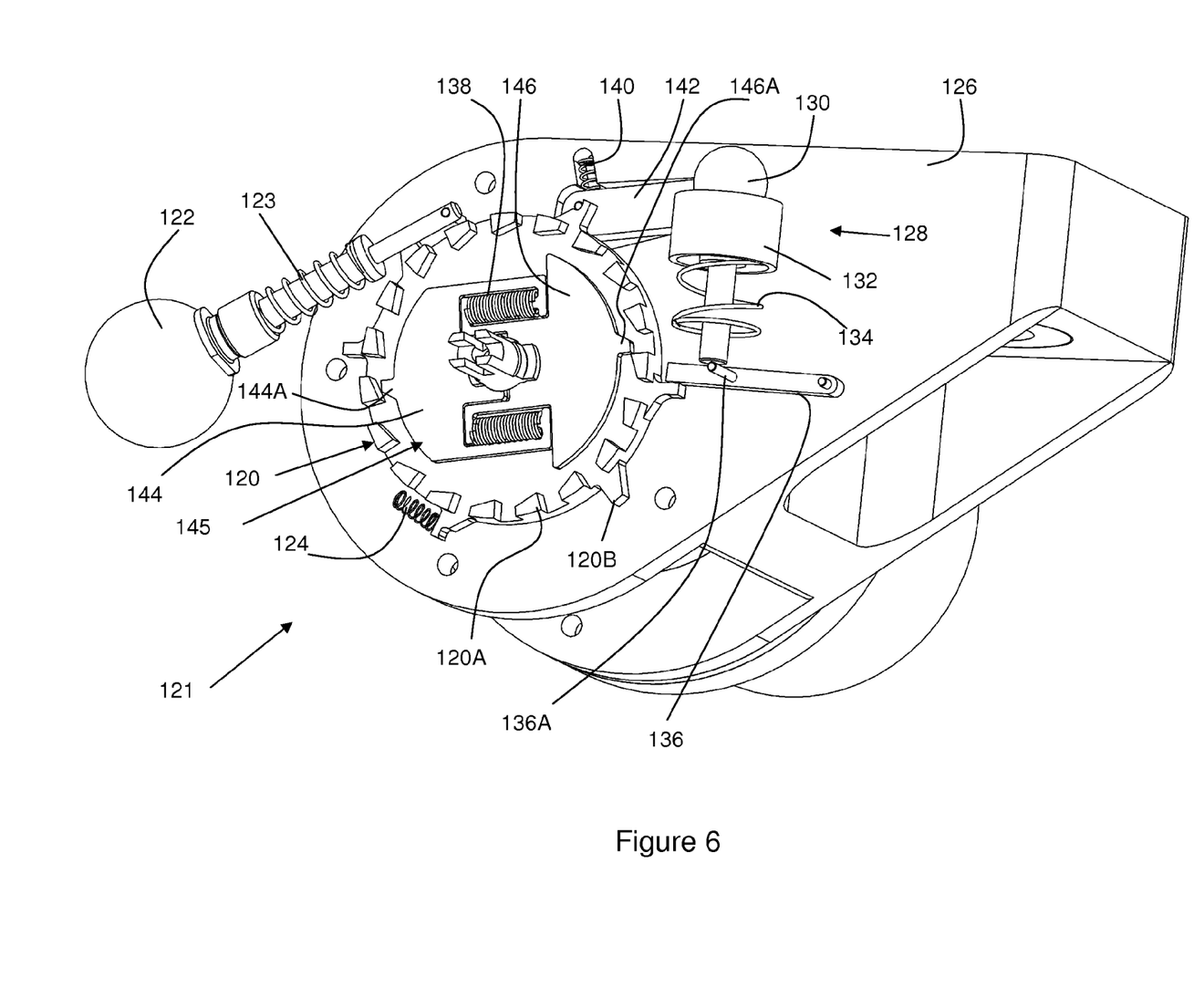
FIG. 6 illustrates a disassembled perspective view of a trigger assembly and manual release assembly according to a preferred embodiment.
Figure 7:
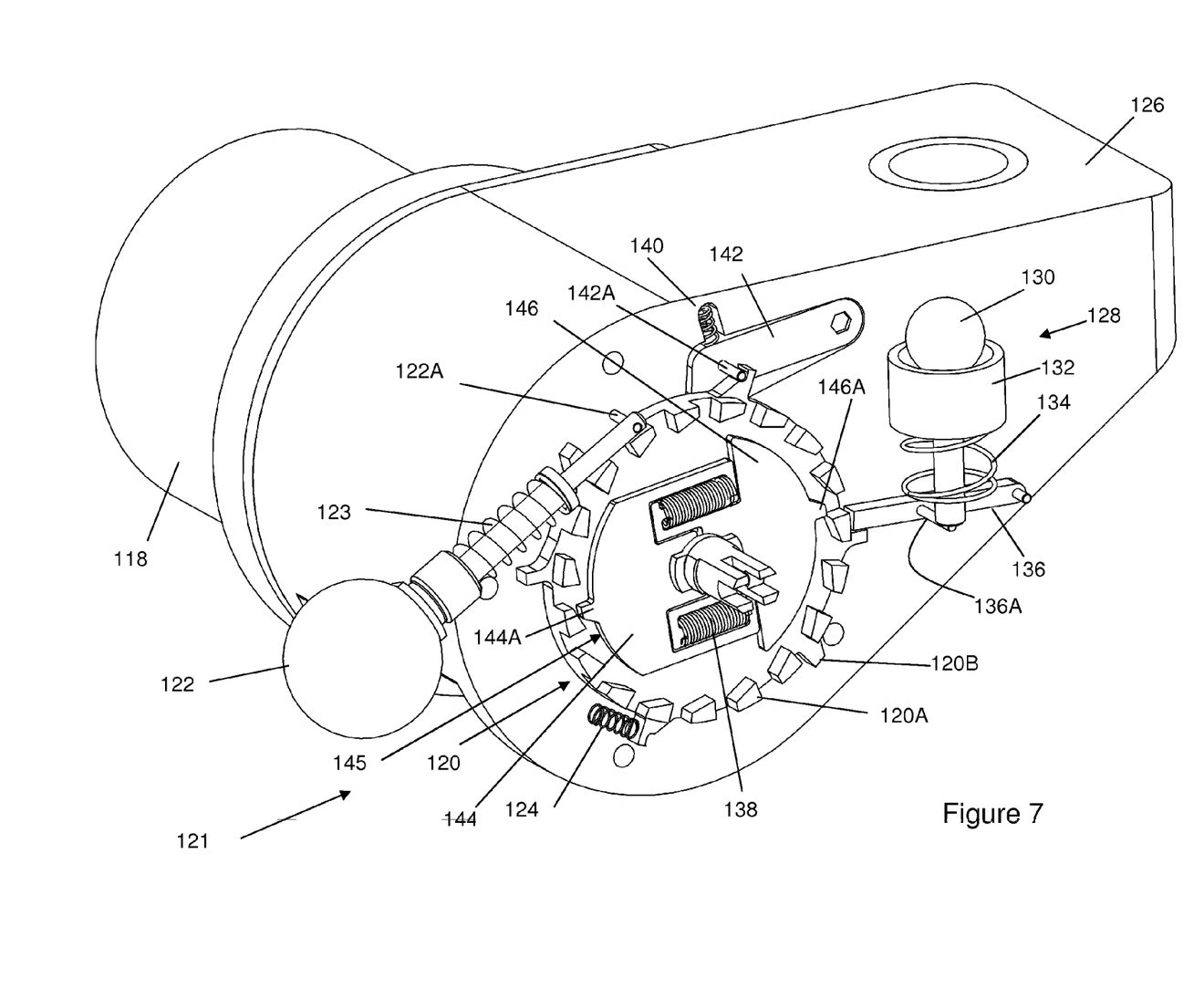
FIG. 7 illustrates a perspective view of the trigger assembly and manual release assembly of FIG. 6.
Figure 8:
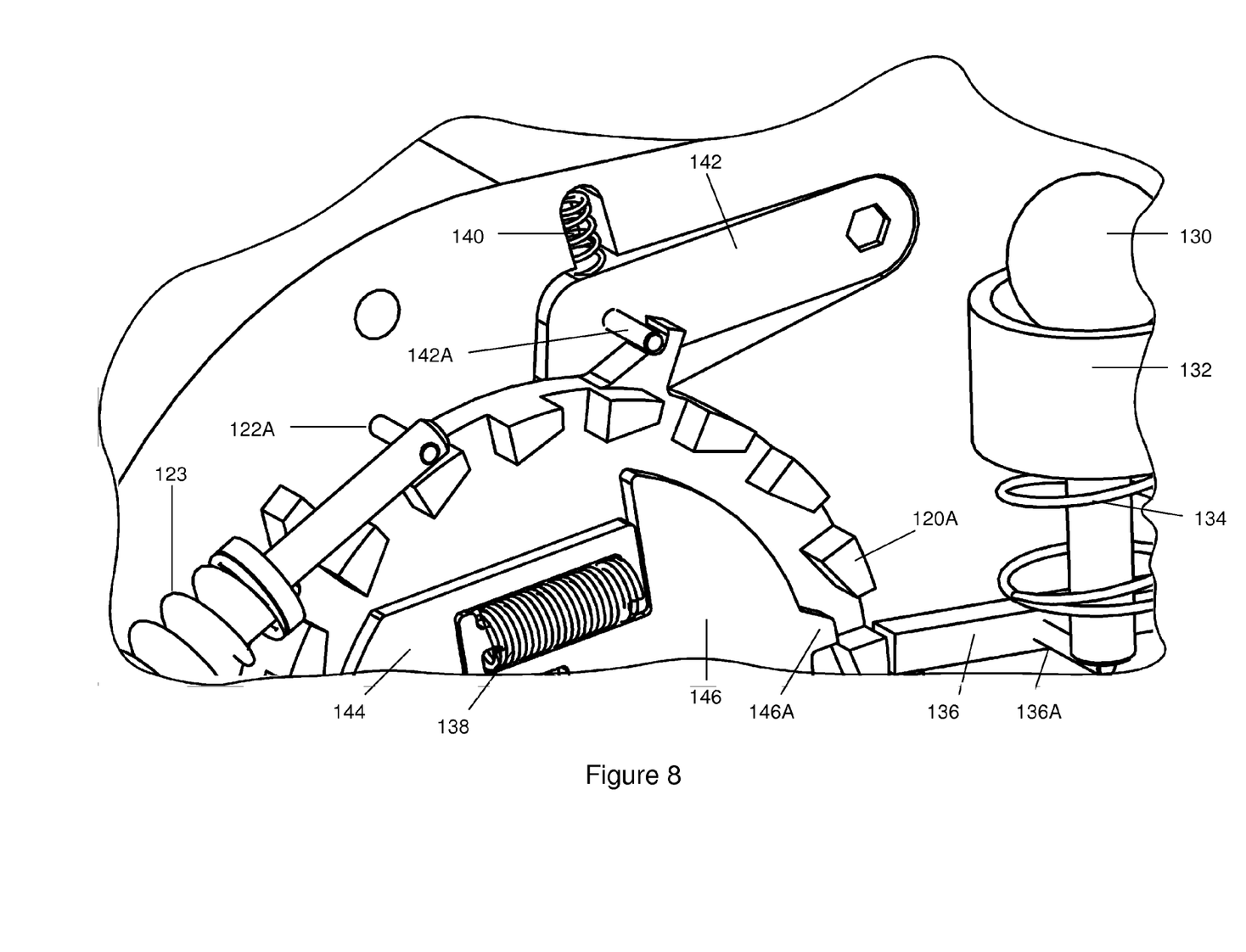
FIG. 8 illustrates a magnified perspective view of the trigger assembly of FIG. 7.

The trigger mechanism 121 includes a rotationally mounted trigger plate 120 having a plurality of radial engagement members 120B and a plurality of perpendicular engagement members 120A. The radial engagement members have various uses in the trigger mechanism 121. For example, a first radial engagement member is in contact with a fixed spring 124 which biases the trigger plate 120 for movement in a counter clockwise rotational direction. In another example, a second radial engagement member 120B contacts and maintains the unlocked spool position by pressing against the pawl pin 142A. In yet another example, a third radial engagement member 120B contacts lever 136 of an acceleration sensor 128.

The acceleration sensor 128 includes a spherical weight 130 that is freely positioned over cup 132. Preferably, an additional enclosure is provided around the weight 130 to prevent it from completely moving off of cup 132. A lower post portion of the cup 132 contacts a lever pin 136A, biasing the lever 136 downward against radial engagement member 120B of the trigger plate 120. The spring 134 preferably reduces the amount of weight that weight 130 places on the pin 136A to allow for greater sensitivity of the acceleration sensor 128. Additionally, the interior surface of the cup 132 includes conical or ramped surfaces for sideways or rolling acceleration.

When the vehicle suddenly accelerates (e.g., drops downward and abruptly stops from a crash), the weight 130 increases pressure on the pin 136A (e.g., from the sudden stop in acceleration) and thereby the lever 136. As the lever 136 moves downward against the radial engagement member 120B, the trigger plate 120 rotates in a clockwise direction, allowing the pawls 142 and 156 to move downward and stop the ratchets 150 and 154 from rotating. When the vehicle banks or rolls hard, the weight 130 will move to the side of the cup 132 against the conical or ramped surface. Since the previously described weight enclosure prevents the weight 130 from moving upwards, away from the cup 132, the cup 132 and its pin are pushed downward, triggering the trigger plate 120 as previously described.

The trigger mechanism 121 can also be activated when the spool 152 is rotated too quickly as opposed to rotating with too much acceleration. Prior restraint trigger mechanisms tend to trigger a locking mechanism at different angular speeds when pulling out the webbing strap. For example, pulling a webbing strap at a constant linear speed away from a restraint device can result in the spool moving more slowly initially (the spool is larger in diameter when fully wound with the webbing) and more quickly after the webbing has been pulled out a distance (the spool is smaller in diameter when less webbing is on the spool). The trigger mechanism 121 reduces this behavior by with two opposed, biased plates 144 and 146.

More specifically, the first velocity plate 144 and the second velocity plate 146 are positioned against the trigger plate 120 and rotate with the spool 152. Both velocity plates 144 and 146 include a mounting groove that allows the plates 144 and 146 to be captured for rotational movement and slide away from the axial. Two springs 146 bias the plates 144 and 146 against each other during normal operation. When these plates 144 and 146 rotate too quickly, the rotational velocity pulls the plates 144 and 146 away from each other, against the bias of the springs 138. As the plates 144 and 146 move away from each other, their engagement members 144A and 146A contact the perpendicular engagement members 120A, causing the trigger plate 120 to rotate and trigger the pawl 142. It should be understood that changing the tension or spring constant of springs 138 can adjust the threshold at which the plates 144 and 146 engage the perpendicular engagement members 120A.

Preferably, the relative spring rates or spring constants of the previously described triggering mechanisms (i.e., springs 124, 134 and 140) are such that once the triggering mechanism 121 has been triggered it will not disengage until manually released by the user. As seen best in FIG. 7, manual release of the triggering mechanism 121 is controlled by pulling back the manual reset handle 122. When triggered, the trigger plate 120 has rotated in a clockwise direction, bringing one of the radial engagement members 120B closer to or in contact with the pin 122A of the handle 122. The user pulls back on the handle 122, against the bias of spring 123 to press the pin 122A against the radial engagement member 120B, thereby rotating the trigger plate 120. When the handle 122 has been pulled back far enough, a radial engagement member 120B near the pawl 142 lifts pawl pin 142A up to unlock the spool 152. Hence, the spool assembly 106 can again extend and retract the webbing strap 108 as needed by the occupant.

Figure 9:
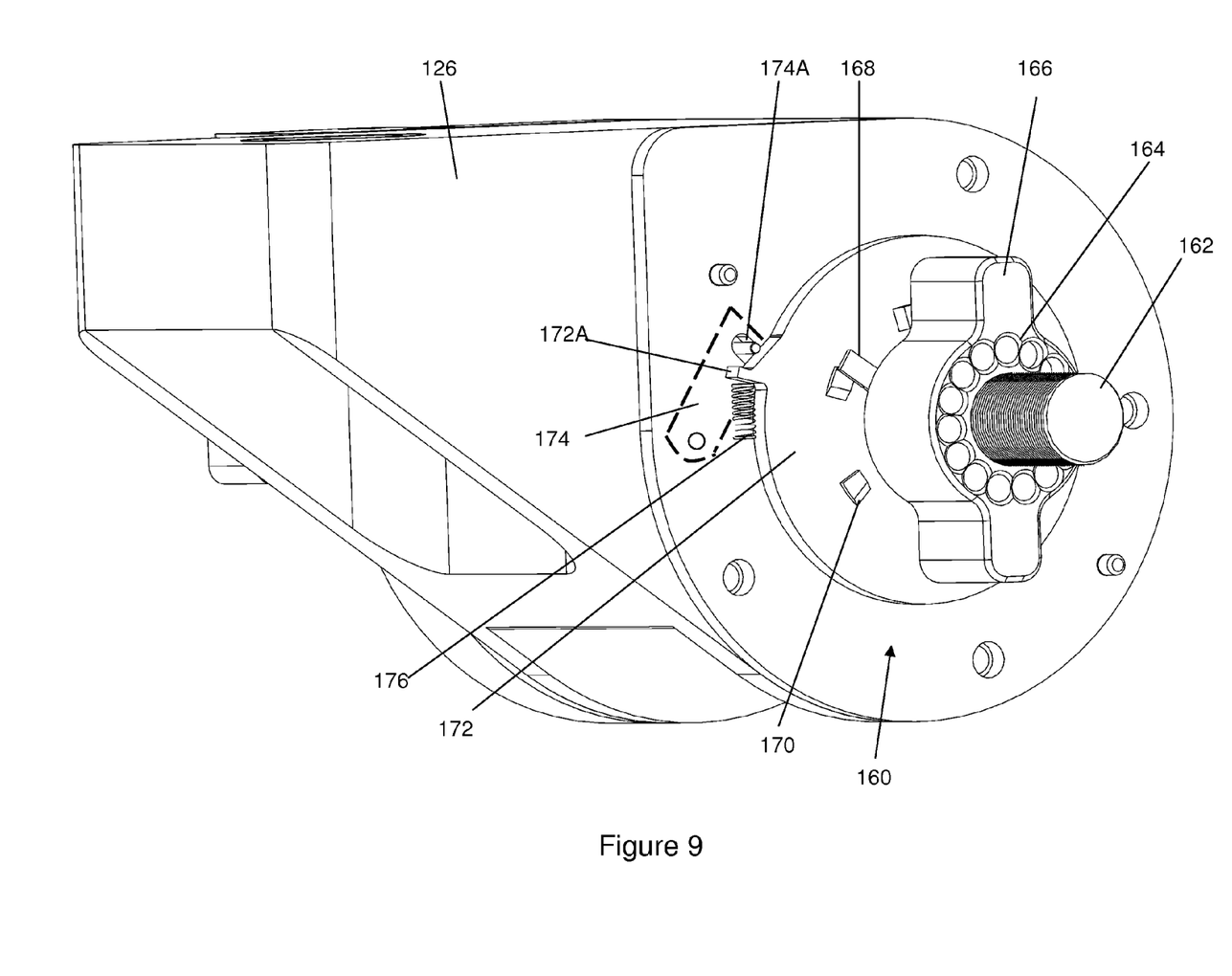
FIG. 9 illustrates a perspective view of an adjustable payout assembly according to a preferred embodiment.
Figure 10:
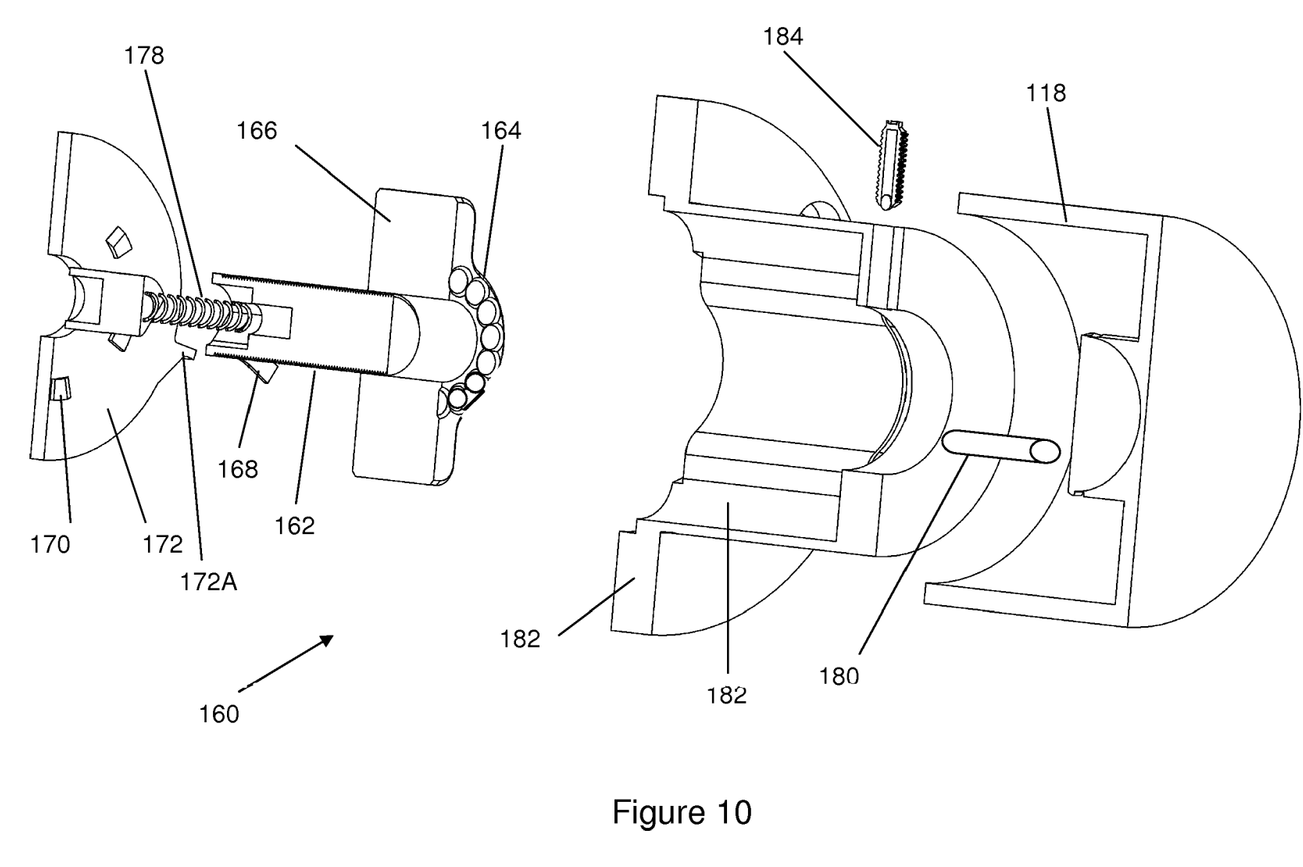
FIG. 10 illustrates an exploded cross sectional view of the adjustable payout assembly of FIG. 9.

FIGS. 9 and 10 illustrate the previously mentioned adjustable payout assembly 160 that stops the webbing strap 108 from unwinding from the spool 152. More specifically, the payout assembly 160 triggers a payout pawl 174 that engages the ratchet 154 (seen in FIG. 4) or alternately a third ratchet.

The payout assembly 160 is actuated by rotation of a lead screw 162 that is keyed or captured by the spool 152. In this respect, the lead screw 162 is free to move along an axis of the spool 152 while also rotating with the spool 152. A compression spring 178 is coupled to an interior of the lead screw 162 to preload the screw 162 away from the spool 152. A trigger nut 166 is threaded over the lead screw 162 and captured by a keyway 182A of the housing 182, allowing the trigger nut 166 to move axially within the keyway 182A.

As the trigger nut 166 moves axially outward, away from the spool 152, a pin 180 contacts and bottoms out on one of the plurality of indentations 164. Since the trigger nut 166 can no longer move axially away from the spool 154, the lead screw 162 unscrews from the trigger nut 166 and thereby move toward the spool 154. As the end of the lead screw 162 approaches the trigger plate 172, a trigger post 168 on the lead screw 162 contacts and engages one of the locking dogs 170 which are raised from the surface of the trigger plate 172.

Normally, the spring 176 biases the trigger plate 172 in a clockwise direction so that the trigger member 172A lifts up the payout pawl pin 174A and therefore the payout pawl 174, allowing the spool 152 to rotate freely. However, when the trigger plate 172 rotates in a counterclockwise direction, driven by the rotation of the lead screw 162, the trigger member 172A moves away from the payout pawl pin 174A, allowing the payout pawl 174 to drop on to the ratchet 154 and stop further movement of the spool 152.

When pressure from the lead screw 162 is removed from the trigger plate 172, the spring 174 urges the trigger plate 172 and the trigger member 172A back in a clockwise position so as to lift the payout pawl pin 174A and thus the payout pawl 174 in a raised position, away from the ratchet 154. In this respect, the spool 152 is free to rotate again (to wind up the webbing strap 108.

The point at which the payout assembly 160 locks can be adjusted by a user by rotating the adjustment knob 118. The previously discussed pin 180 is eccentrically positioned inside the adjustment knob 118. Therefore, rotation of the knob 118 aligns the pin 180 with different indentations 164 on the trigger nut 166. Each of the indentations 164 are located at different depths from the surface of the trigger nut 166 and therefore allow the trigger nut 166 to move to various distances from the trigger plate 172. Hence, the payout assembly 160 will lock at various, user adjustable positions.

Figure 11:
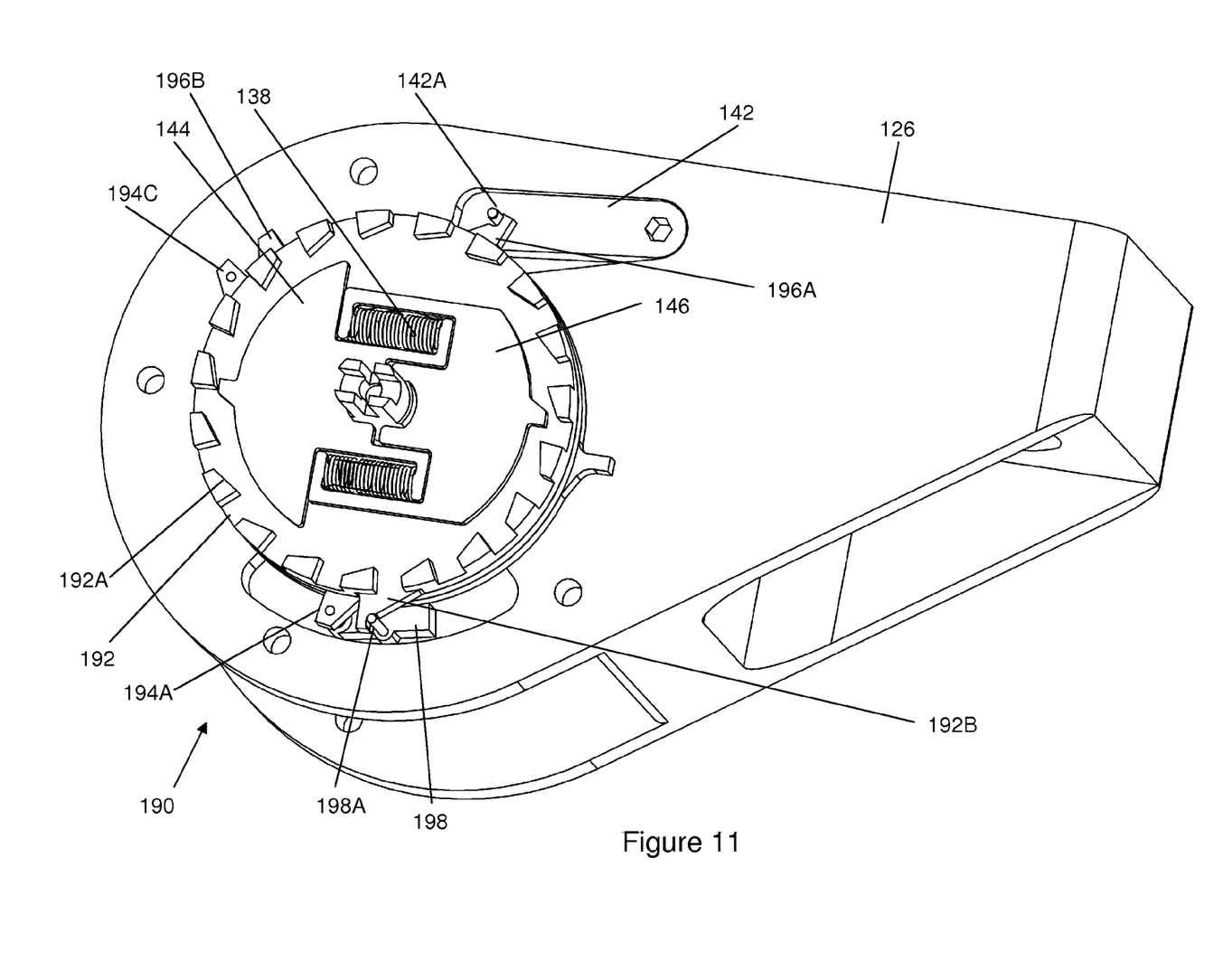
FIG. 11 illustrates a perspective view of an dual trigger assembly according to a preferred embodiment.
Figure 12:
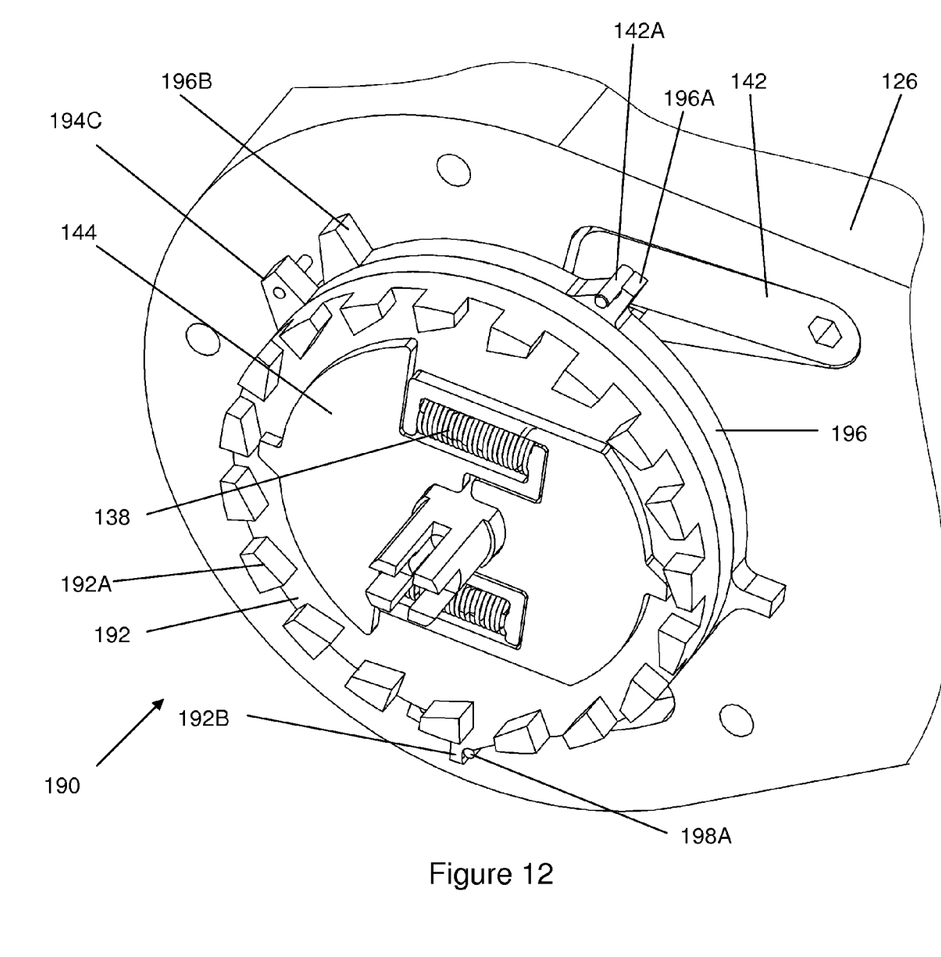
FIG. 12 illustrates a perspective view of the dual trigger assembly of FIG. 10.
Figure 13:
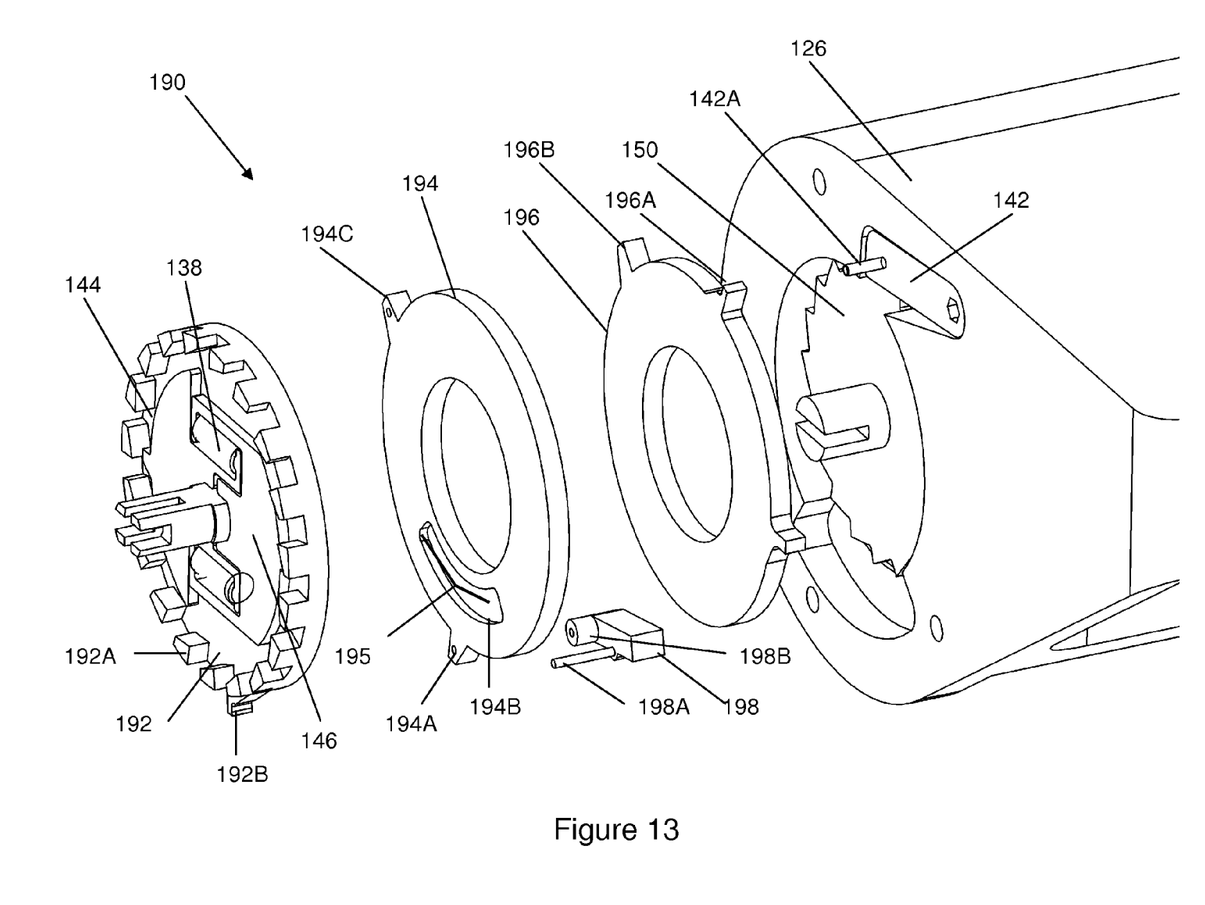
FIG. 13 illustrates an exploded perspective view of the dual trigger assembly of FIG. 11.

FIGS. 11-13 illustrate an alternate preferred embodiment of a trigger assembly 190 that engages a first trigger mechanism that automatically releases when tension is released and a second trigger mechanism that must be manually released. In this respect, the spool 152 can be locked by pulling on the webbing strap 108, and then unlocked by releasing tension on the webbing strap 108. However, if the pulling exceeds a certain threshold, the spool 152 must be manually released.

In addition to the previously described pawl 142, an automatic reset pawl 198 is pivotally mounted via pivot 198B underneath ratchet 150. A pawl pin 198A is connected to a side of the pawl 198 and extends through an aperture in the framework 126.

As best seen in FIG. 13, trigger assembly 190 includes an automatic-unlock trigger plate 192 that is engaged by velocity plates 144 and 146 as previously described in this specification. The automatic-unlock trigger plate 192 is rotationally biased in a counter clockwise direction via a spring (not shown) similarly to the previously described plate 120. This rotational bias urges radial engagement member 192B toward the pawl pin 198A, preventing the pawl 198 from contacting the ratchet 150.

When the velocity plates 144 and 146 engage the axial engagement members 192A, the plate 192 is rotated in a clockwise direction, causing member 192B to release pressure on pawl pin 198A and thereby causing the pawl 198 to engage the ratchet 150. When pressure is released on the webbing strap 108, the velocity plates 144 and 146 release their engagement of the plate 192, allowing the spring to rotate the plate 192 back in a counter-clockwise direction to reengage the pawl pin 198A and thereby release the pawl 198 from the ratchet 150.

As previously discussed, if the force and or acceleration of the webbing strap exceeds a threshold, a manually released trigger mechanism is activated. This threshold is created, in part, by a resistance spring 195 in a recessed spring well 194B. The resistance spring 195 is engaged with the spring well 194B and a ramp (not shown) on the back of plate 192. The resistance spring 195 compresses when the plate 192 is rotated with a relatively slow or low acceleration. However, faster rotational speed or acceleration overcomes the compression of the spring 195, causing the mating plate 194 to rotate in a clockwise direction. A pin on radial engagement member 194C contacts and pushes radial engagement member 196B of the manual unlock trigger plate 196, thereby causing trigger plate 196 to rotate in a clockwise direction. This rotation releases pressure of radial engagement member 196A on the pawl pin 142A, causing the pawl 142 to lower onto the ratchet 150 and lock the spool 152.

Preferably, the trigger plate 196 is spring biased in a counterclockwise position, but with a force that will not overcome rotation of the trigger plate in the locked position. In other words, once the trigger plate 196 locks, it remains in its locked, rotated position.

While not shown in FIGS. 11-13, a manual release mechanism can be used to release the trigger plate 196, thereby rotating the plate 196 back to its original position and lifting the pawl 142. For example, the manual release mechanism shown in FIGS. 5-8 (i.e., the handle 122, spring 123 and pin 122A) can be used to release the trigger plate 196.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A restraint system for a standing occupant in a vehicle comprising:
    a framework mounted to an interior of the vehicle;
    a spool disposed within said framework;
    a strap coupled to said spool and connectable to an occupant harness; and
    a payout assembly disposed on said framework and connected to said spool to selectively limit rotation of said spool at a predetermined number of rotations of said spool, said payout assembly comprising;
        a lead screw arranged to rotate with said spool and move along an axis of said spool; and
        a pawl and a ratchet coupled to the spool.

2. The restraint system of claim 1 further comprising a user control for adjusting said predetermined number of rotations of said spool.

3. The restraint system of claim 1 wherein said payout assembly further comprises a trigger plate in contact with said pawl.

4. The restraint system of claim 3 wherein said payout assembly further comprises a nut threaded on said lead screw.

5. The restraint system of claim 4 wherein said payout assembly further comprises a housing having a pin that extends internally towards said spool.

6. The restraint system of claim 5 wherein a surface of said nut comprises a plurality of indentations complementary to said pin.

7. The restrain system of claim 6 wherein a user control is configured to adjust a position of said pin relative to said plurality of indentations of said nut.

8. The restraint system of claim 3 wherein said lead screw is configured to reversibly engage said trigger plate.

9. The restrain system of claim 3 wherein said trigger plate is biased to disengage said pawl from said ratchet.

10. The restraint system of claim 1 wherein said lead screw is biased away from said spool.

* * * * *